Sept. 29, 1942.                                           2,297,416
              HARTMUT ISRAEL KALLMANN,
     FORMERLY KNOWN AS HARTMUT KALLMANN, ET AL
  EXAMINATION OF SUBSTANCES OR BODIES BY MEANS OF NEUTRONS AND X-RAYS
                  Filed Nov. 15, 1939
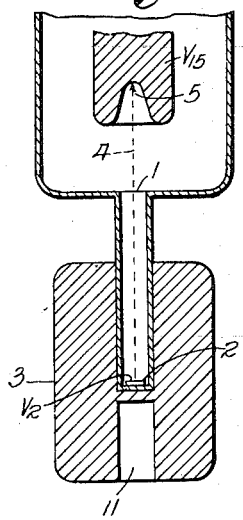
Fig.1.
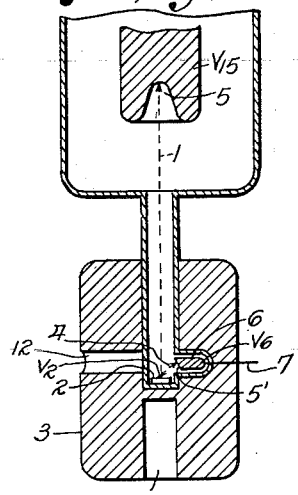
Fig.2.
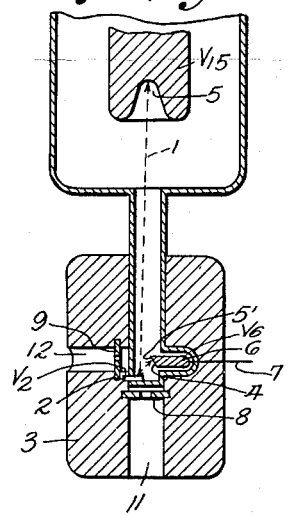
Fig.3.
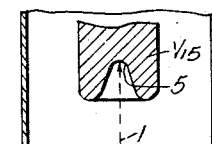
Fig.4.
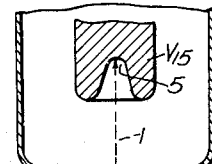
Fig.5.
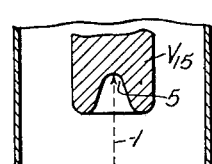
Fig.6.
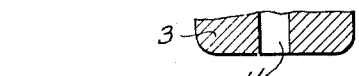
Fig.7.
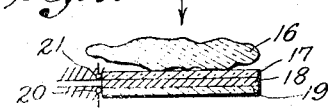
Inventors,
HARTMUT ISRAEL KALLMANN,
FORMERLY KNOWN AS
HARTMUT KALLMANN AND
ERNST KUHN.
By, Pierce & Scheffler,
their Attys.

Patented Sept. 29, 1942

2,297,416

UNITED STATES PATENT OFFICE 2,297,416

EXAMINATION OF SUBSTANCES OR BODIES BY MEANS OF NEUTRONS AND X-RAYS

Hartmut Israel Kallmann, formerly known as Hartmut Kallmann, Berlin - Charlottenburg, and Ernst Kuhn, Berlin, Germany; vested in the Alien Property Custodian Application November 15, 1939, Serial No. 304,596
In Germany November 18, 1938

15 Claims. (Cl. 250—84)

Substances or bodies including living tissue, may be examined by exposing them to a beam of neutrons in a similar manner to that adopted with Roentgen or X-rays. This method of examination is referred to in our prior United States Patents No. 2,186,757 and No. 2,188,115. The beam of neutrons, after passing through the body, is caused to encounter a fluorescent screen, or a photographic layer, or both, upon which it then produces, as a result of an appropriate reaction, an image of the body. This image or photograph of the body differs from the corresponding photograph which is obtained when X-rays are passed through the same body in a characteristic manner. This is due to the different behaviour as regards absorption of the body to neutrons and to X-rays. In order to obtain the maximum of information regarding the nature of the object, it is desirable to expose it not only to neutrons but also to X-rays, because a comparison of the two images thus obtained allows more complete conclusions to be drawn regarding the structure of the object than can be obtained from a neutron image or an X-ray image alone. In order to be able to compare a neutron image and an X-ray image with one another it is desirable to take the neutron and the X-ray photographs under conditions which are as similar as possible, i. e. it is best to take the two photographs at the same time or one immediately after the other and in the same direction.

This invention relates to means for portraying objects with the aid of neutrons and X-rays under most similar conditions. There is employed an arrangement which supplies either a beam of neutrons, or a beam of X-rays suitable for producing an image, or both at the same time. These neutron or X-ray beams encounter the object to be portrayed in the same direction or in approximately the same direction as the neutrons. Beyond the object which is to be portrayed there is arranged first a layer of photographic material which is sensitive to X-rays but insensitive to neutrons. An X-ray photograph of the object is thus obtained on this layer. As close as possible behind this X-ray layer there is arranged a layer which is as sensitive as is reasonably possible to neutrons; and there is thus obtained on this layer a neutrons photograph of the object. As all layers or systems that are sensitive to neutrons (for example, a sensitive intermediate layer associated with a fluorescent screen, a sensitive intermediate layer associated with a photographic layer, or a sensitive intermediate layer associated both with a fluorescent screen and a photographic layer) are also appreciably sensitive to X-rays, the layer sensitive to neutrons is surrounded with a layer of X-ray-absorbing material, and preferably with a layer of lead, which is thick enough to screen off the X-rays sufficiently. There is then obtained a photograph which is almost solely produced by the neutrons. In some circumstances it is convenient to make the system sensitive to neutrons such that it is as insensitive as is reasonably possible to X-rays; the screen for giving protection from X-rays may then be made relatively thin.

If the neutron or X-ray picture is to be observed visually on a fluorescent screen, the neutron fluorescent screen need not be covered with a protective layer on the side adjacent to the observer. The observer then sees only a neutron image or portrayal of the object on the fluorescent screen. In order that the X-ray image may be seen, the neutron fluorescent screen may then be removed together with its ray protector. The X-ray fluorescent screen is then seen and on it the X-ray image. It is true that in this case the X-ray image and the neutron image are not seen exactly at the same time, but only one immediately after the other; however they are seen under exactly the same special conditions. In this manner there is thus obtained equivalent neutron and X-ray images of the object to be examined. In many cases it will be desirable, in order that the two images may be really comparable, to make the angles of divergence of the X-ray and neutron beams incident on the object as nearly the same as is reasonably possible. However, it may be of advantage in some cases to make these angles different artificially with a view to revealing more clearly certain peculiarities of the object being examined.

Now in order that an arrangement in accordance with the invention which supplies neutrons may also be used as a source of X-rays for directing through an object in order to produce an image of it, it is not sufficient for the neutron tube to supply a general X-ray radiation, because in order to obtain images with X-rays it is necessary for the X-ray radiation to proceed as far as possible from one point. In order to obtain a discharge tube which is suitable for use in portraying objects both by means of X-rays and neutrons, the following procedure may, for example, be adopted. Every neutron tube consists of a source which emits a beam of ions which are subsequently further accelerated. When the accelerated ions impinge upon the layer in which the neutrons are produced the ions are retarded, whereupon they emit X-rays. This X-radiation may be used for image-producing purposes if the ray of ions is caused to impinge upon a spot which is as small as possible, because only then is the X-radiation brought to a sufficiently sharp point. In general, however, the production of X-rays as a result of the impingement of rapid heavy particles is extremely small. It is therefore in many cases more convenient to produce the X-rays in the neutron tube in the following way:

When the rapid ions encounter a surface, relatively slow, secondary electrons are produced. These secondary electrons may also be accelerated in the reverse direction to the rapid ions by means of the field which accelerates the ions, and these electrons may be caused to impinge only upon a relatively small spot on the anode, for example, by adopting a suitable form of electrode or by means of additional electrical or magnetic lenses, or by adopting two or more of these expedients. The Roentgen rays then proceed from this spot. The arrangement may be such that only a fraction of the secondary electrons is accelerated in the direction of the anode. The relationship of the X-ray intensity may thus be established in desired manner.

Instead of arranging for secondary electrons to be released by the accelerated heavy particles, an incandescent wire may be introduced laterally into the tube, from which wire proceed electrons which are then concentrated by suitable magnetic or electric auxiliary fields or both on a definite point on the anode. The X-rays then proceed from the anode and the neutron rays from the neighbourhood of the cathode. In this case, in order to bring the direction of the X-radiation into agreement, neutron and X-rays will preferably be screened in the direction of the accelerating field.

When a subdivided discharge tube is used, in which the voltage accelerating the ions is not applied to the discharge tube in one stage, but by means of a number of electrodes to each of which is applied only a part of the entire voltage, it is convenient in certain circumstances to generate the X-rays by causing the secondary electrons or the electrons proceeding from an auxiliary incandescent wire to impinge upon one of the above-mentioned intermediate electrodes by giving a suitable form to the electrodes or to the auxiliary electrodes, or to both. For example, they may impinge on the first intermediate electrode, so that the electrons pass through only a small part of the entire voltage.

However, it is in certain circumstances desired, in examining an object with X-rays, and in order to obtain an image having a sufficiently strong contrast, to expose it primarily with a relatively soft X-radiation. If the ion-accelerating voltage of the neutron tube is relatively large, there is obtained, however, in the arrangements described above by way of example, always a relatively hard X-ray spectrum. An X-ray spectrum of a desired softness or hardness may, however, readily be obtained if there is arranged, in the space into which the ions pass after their acceleration, an auxiliary electrode, in such a manner that the secondary electrons or the electrons proceeding from an auxiliary incandescent wire, are accelerated only on to this newly-introduced auxiliary electrode. Matters may thus be adjusted to give any desired hardness and any desired intensity.

A desired hardness of the X-ray spectrum may also be obtained by making the electrons proceed from an auxiliary incandescent wire and charging this auxiliary incandescent wire to a negative potential which is so high that the electrons are concentrated by this wire on a small spot on the earthed casing of the neutron tube and the X-rays are emitted from the point of impingement.

In other cases it may be convenient not to work directly with the X-radiation proceeding from the anode because this may be, for example, too hard. The arrangement may then be such that the relatively intense X-radiation which proceeds from the anode is first made to strike a dispersing body and the object to be studied is only exposed to the X-radiation that proceeds from the dispersing body.

The invention will now be described in greater particularity in the following and with reference to the accompanying drawing, in which:

Fig. 1 is a diagrammatic sectional view of an apparatus embodying the invention;

Fig. 2 is a diagrammatic sectional view of a modification of the apparatus shown in Fig. 1;

Fig. 3 is a diagrammatic sectional view of another modification of the apparatus shown in Fig. 1;

Fig. 4 is a diagrammatic sectional view of a further modification of the apparatus shown in Fig. 1;

Fig. 5 is a diagrammatic sectional view of another modification of the apparatus shown in Fig. 1;

Fig. 6 is a diagrammatic sectional view of an additional modification of the apparatus shown in Fig. 1; and Fig. 7 is a fragmentary sectional view of a portion of the device illustrated in Figs. 1 to 6 inclusive in its relation to the object to be portrayed and to a ray-sensitive layer.

In all the forms of apparatus illustrated, the secondary electrons which are released from a beam 1 of ions, when it encounters a reaction layer 2 which supplies the neutrons, are accelerated by the field accelerating the ions and in the opposite direction to the ions. The beam 4 of electrons which is generated in this manner encounters at 5 the body emitting the X-rays. An electrical or magnetic field is used to concentrate the beam of electrons because it is advantageous to produce a focal point which is as small as possible. The neutrons, in the examples shown in Figures 1, 2 and 6, pass through a passage 11 out of a body 3 which retards the neutrons, and which is, for example, of a substance containing hydrogen. The X-rays proceeding from the focal point 5 emerge in the same direction.

In the example illustrated in Figure 2, the secondary electrons are accelerated on to face 5' of the anti-cathode 6, disposed at one side, to which is applied by way of the high tension lead 7 a positive potential which is high with respect to the reaction layer 2. The neutrons are either conducted in the direction of the beam of ions through the passage 11 or at right angles to it through another passage 12 to the body to be examined. The X-rays proceed from the focus in all directions of the half-chamber lying in front of the anti-cathode so that X-rays also pass out in the direction of the passengers 11 and 12.

In the arrangement illustrated in Figure 3, the X-rays are screened by the lead screens 8 and 9. This arrangement does not differ in other respects from that of Figure 2. In some circumstances it is convenient to arrange the anticathode 6, as is indicated in Figure 4, so that its end face 5' forms only a small angle with the surface giving off the neutrons and to accommodate it in an obliquely-arranged lateral arm. In this manner metal parts not required for the production of neutrons are avoided in the vicinity of the source of neutrons. The same arrangements may also be provided with an incandescent wire as the source of electrons. Fig. 5 shows an arrangement of this kind. The ray 1 of positive ions releases neutrons from the reaction layer 2. In the proximity of this source of neutrons, a source of electrons, for instance, an incandescent wire 14 from which electrons are emitted, is provided in a lateral protuberance 13, these electrons being accelerated by the electric field existing between the source of electrons and the anode 6 so that they impinge on the end surface 5' of the anode and generate X-rays there. The incandescent wire 14 is conveniently arranged in the lateral protuberance 13 of the discharge vessel lying outside the stream of ions so that the electrons can be accelerated on to the face 5' of the anti-cathode.

Figure 6 illustrates an arrangement which is especially suitable for very high voltages. Primary X-rays are not used for producing the image; instead the X-rays produced with one of the arrangements according to Figures 1 to 4 are directed upon a dispersion body 10 in which secondary X-rays are produced and are directed through the passages 11 and 12 to the body to be exposed to them. With this arrangement a narrow pencil of X-rays may be separated out by means of lead screens 8 and 9 in a similar manner to that illustrated in Figure 3. The advantage of this arrangement is that rays of less hardness may be produced even by means of discharge tubes in which very high voltages are used for producing the neutrons. The dispersion body may also be arranged outside the discharge chamber so as to be interchangeable.

In Figures 1 through 6 the potentials of the electrodes are marked "V" with the proper index. The potential $V_{15}$ is positive in relation to $V_2$ and $V_6$ is likewise positive in relation to $V_2$. In general, however, the difference in potential between $V_{15}$ and $V_2$ is much greater than the difference between $V_6$ and $V_2$. The same is true of Figs. 3 and 4. In the arrangement according to Fig. 5, $V_{15}$ is positive in relation to $V_2$, $V_{14}$ is positive or negative, or the same potential as $V_2$, and $V_6$ positive in relation to $V_{14}$. In Fig. 6, $V_{15}$ is positive in relation to $V_2$. In general, the potential $V_2$ is equal to ground potential.

Fig. 7 shows the arrangement according to the invention for producing a representation of the body 16 by means of X-rays, or neutron rays, or X-rays and neutron rays. For this purpose, one of the devices shown in Figs. 1 to 6 inclusive is used for producing a neutron beam, or an X-ray beam, or a neutron beam and an X-ray beam. The neutron beam, or X-ray beam, or neutron and X-ray beams issuing from the tube 11 penetrate the body 16 and impinge on the layer 17, which latter is as sensitive as possible to X-rays but as unaffected as possible by neutrons,—for instance, a photographic plate. Behind this photographic plate, a layer 18 absorbing the X-rays can be provided in case the layer 19 sensitive to neutrons likewise possesses a certain sensitivity to X-rays. The layer sensitive to neutrons consists for instance of a lithium layer and an adjacent layer as completely as possible unaffected by X-rays: or, it can consist of a lithium layer with an adjacent luminous mass that is as insensitive as possible to X-rays. Other layers likewise could, however, be employed from which charged particles or Gamma rays would be released by the neutrons, these acting on the adjacent photographic layer or luminous mass.

The absorption layer 18 can be omitted in case the arrangement is constructed in such manner that the layer 19 sensitive to neutrons can be folded out of the path of the X-ray beam, for instance as by means of the joint 20.

Under certain conditions, it is advisable likewise to provide a device of this kind for moving the layer sensitive to neutrons and in certain cases the body 18 protecting it from the X-rays, in case it is desired to observe the layer 17 sensitive to X-rays, for instance a luminous screen for X-rays, before or after the taking of the picture with the aid of the neutrons.

Having now particularly described and ascertained the nature of our said invention and in what manner the same is to be performed, we declare that what we claim is:

1. Apparatus for portraying objects by means of neutrons and X-rays, comprising a vacuum-tube housing means for generating neutron radiation suitable for depicting objects and means for generating a beam of X-rays suitable for depicting objects, said neutron radiation generating means and said X-ray generating means being arranged to deliver said neutron radiation and said X-ray beam along a path substantially coincident with each other and impinging upon the object to be investigated.

2. Apparatus for portraying objects by means of neutrons and X-rays, comprising a vacuum-tube housing means for generating neutron radiation suitable for depicting objects and means for simultaneously generating a beam of X-rays suitable for depicting objects, said neutron radiation generating means and said X-ray generating means being arranged to deliver said neutron radiation and said X-ray beam along a path substantially coincident with each other and impinging upon the object to be investigated.

3. Apparatus for portraying objects by means of neutrons and X-rays, comprising a vacuum-tube housing means for generating neutrons and independent means for generating a beam of X-rays suitable for depicting objects, and means associated with said vacuum-tube for providing a restricted path through which neutrons can pass in the direction of, and to impinge upon, an object to be investigated, the X-ray beam-generating means being arranged to deliver said beam along a path substantially coincident with said restricted path for neutrons.

4. Apparatus for portraying objects by means of neutrons and X-rays, comprising a vacuum-tube housing plural means for the generation simultaneously of neutrons and of a beam of X-rays suitable for depicting objects, and means associated with said vacuum-tube for providing a restricted path through which neutrons can pass in the direction of, and to impinge upon, an object to be investigated, the X-ray beam-generating means being arranged to deliver said beam along a path substantially coincident with said restricted path for neutrons.

5. The apparatus defined in claim 1, in which the neutron radiation-generating means includes a layer yielding neutrons and emitting X-rays upon impingement thereupon of ion rays and means for generating a pencil of ion rays and for directing said ion ray pencil at a closely limited area of said layer.

6. The apparatus defined in claim 1, in which the neutron radiation-generating means includes a layer yielding neutrons and emitting X-rays upon impingement thereupon of ion rays, means for generating a pencil of ion rays and for directing said ion ray pencil at a closely limited area of said layer, and means for creating and maintaining an electric field adapted to accelerate and concentrate secondary electrons.

7. The apparatus defined in claim 1, in which the neutron radiation-generating means includes a layer yielding neutrons and emitting X-rays upon impingement thereupon of ion rays, means for generating a pencil of ion rays and for directing said ion ray pencil at a closely limited area of said layer, and means for creating and maintaining an electric field adapted to accelerate and concentrate secondary electrons and said ion rays.

8. The apparatus defined in claim 1, in which the neutron radiation-generating means includes a neutron tube, and the X-ray generating means includes a separate source of electrons arranged within said neutron tube.

9. The apparatus defined in claim 1, in which the neutron radiation-generating means is a neutron tube including means for generating a pencil of ion rays, and the X-ray generating means includes a separate source of electrons said source being arranged in the cathode part of said neutron tube and on one side of the path of travel of said ion ray pencil.

10. The apparatus defined in claim 1, in which the neutron radiation-generating means includes a neutron tube, and the X-ray generating means includes a dispersion body adapted to yield X-rays upon impingement thereupon of accelerated electrons and an electron-accelerating means.

11. Apparatus for portraying objects by means of neutrons and X-rays, comprising means for producing neutrons and X-rays, means for causing the neutrons and X-rays to travel along substantially coincident paths in the direction of and to impinge upon an object to be investigated, and a neutron-sensitive system and an X-ray sensitive system arranged behind such object to be portrayed and in operative relation with respect to the means producing neutrons and X-rays, which neutron-sensitive system is as insensitive as reasonably possible to X-rays and which X-ray sensitive system is as insensitive as reasonably possible to neutrons.

12. The apparatus as defined in claim 11 in which the neutron-sensitive system is protected against X-rays by a material which absorbs X-rays.

13. The apparatus as defined in claim 11 in which the neutron-sensitive system is movable.

14. The apparatus as defined in claim 11 in which the neutron-sensitive system is movable together with the layer protecting it against X-rays.

15. A method for portraying objects comprising directing a beam of neutrons and a beam of X-rays upon the object to be portrayed and behind this object arranging an X-ray sensitive system and a neutron-sensitive system one behind the other.

HARTMUT ISRAEL KALLMANN.
(Formerly known as Hartmut Kallmann)
ERNST KUHN.